Patented Aug. 7, 1934

1,968,845

UNITED STATES PATENT OFFICE 1,968,845

PROCESS FOR PRODUCING ACTIVATED CARBON

Jacque C. Morrell, Oak Park, Ill.

No Drawing. Application December 4, 1930, Serial No. 500,140

2 Claims. (Cl. 252—3)

This invention relates to the production of adsorbent charcoals or activated carbons. More particularly it is a specific application and example of the principles and concepts of my previously issued patents relating to the preparation of suspensions and emulsions and the production of artificial or synthetic adsorbent charcoals or activated carbons. These issued patents are: #1,440,355—December 26, 1922—Suspension and emulsion and process of making same;. #1,440,356—December 26, 1922—Suspensions and emulsions; #1,478,985—December 25, 1923—Artificial or synthetic charcoal and process of producing the same; #1,478,986—December 25, 1923—Manufacture of artificial charcoal; #1,478,987—December 25, 1923—Production of adsorbent charcoal; #1,530,392—March 17, 1925—Process of making compound adsorbent catalysts; #1,530,393—March 17, 1925—Process of making adsorbent carbon.

It is the present purpose to disclose herein the use of specific raw materials, method and conditions in applying the processes already broadly described and disclosed in the above mentioned patents.

The product of the process may be employed for the removal of impurities from air for respiration, or for the concentration and recovery for further use of valuable gases or vapors in a great many industrial processes. This charcoal may also be used in various industrial and laboratory processes as a decolorizing and purifying agent for the removal of color and impurities from liquids and solutions, for example, in the refining of oils of a vegetable, mineral or animal character, and decolorizing and refining of sugar, glycerine and other organic substances. Also, as an adsorbent for gases and vapors and decolorizer of various substances and as a deodorant and purifier of all types of liquids and solutions, its use is practically unlimited. It may be applied wherever adsorptive, decolorizing or purifying material can be used in the liquid or gas phase.

Some of its important industrial uses are:

The recovery of gasoline vapors from natural gases and still gases. The recovery and purification of vaporized solvents in air or gas mixtures; the refining and decolorization of hydrocarbon distillates and their derivatives; the refining and decolorizing of animal and vegetable oils; for air conditioning and humidity control; as a catalyst; for decolorizing and purifying of sugar solutions, glycerine and aqueous or non-aqueous solutions of organic compounds; purification of water and air; as a deodorant.

Among the specific uses in which the product finds wide application is in the refining of cane sugar, glucose, and other sugars; water purification, for example in the superchlorination process; in the removal of impurities from inorganic and organic compounds; refining of glucose and various syrups such as those from cane, corn, maple and sorghum, gelatines, phenols, drugs, pharmaceuticals, and the bleaching and purification of various crude and partly refined off-grade and off-flavored food oils, including cotton-seed, linseed, rape-seed, cocoanut, soy-bean, and animal oils and fats, including lard, fish oils, medicinal oils, etc. Some special fields of application are: industrial water, garage wastes, paint oils, varnishes and resins, medicinals, recovery of waste photographic solutions, recovery of precious metals, and the like.

Briefly, the process as disclosed by my issued patents consists in mixing finely divided charcoal or carbon with a binder which chars on heating, molding or compressing the mixture, comminuting the molded or briquetted material, subjecting the product thereof to heat treatment to carbonize the same, and thereafter subjecting the carbonized product to an activation treatment, such as treatment with steam at elevated temperatures and then, in some cases, subsequently treating of the product with dilute acid finally removing the acid by washing with water and drying.

More specifically, the process consists in mixing finely divided carbon or charcoal with an emulsion of a binder which chars on heating, separating the water from the mixture of carbon and binder, preferably by filtering and then subsequently drying and continuing the process as described above. The process of making the emulsion of the binder is described in Patents Nos. 1,440,355 and 1,440,356. Other methods of preparing the mixture of the carbon and the binder are described in the above-mentioned issued patents.

The operation of the process of my invention is briefly as follows: Finely divided carbon, for example, hardwood charcoal, is mixed with water containing a protective colloid to make a thick paste of the same. The protective colloid may consist of any of the classes of materials described in my issued Patent No. 1,440,356, for example, ammonium tannate or casein. The latter is prepared by dissolving the casein in a dilute solution of an alkali.

An emulsion of soft pitch is prepared by first suspending finely divided hard pitch, for example, coal tar or wood tar pitch, sufficiently hard to grind, for example, of approximately 220° F.—

300° F. melting point, in water containing a protective colloid, for example casein dissolved in a dilute alkali, and then preparing an emulsion of a coal tar or wood tar distillate, for example, anthracine oil, creosote oil, or the like, by agitating the oil with an equal volume of an emulsifying agent, which consists of water containing dissolved therein one of the classes of protective colloids previously referred to, for example, casein dissolved in an alkali solution. The suspension of pitch and emulsion of oil are mixed and the resulting emulsified binder is mixed with the charcoal. The water is separated preferably by filtration, the mixture subsequently dried and molded or briquetted. The molded material or briquettes are crushed and ground or comminuted, and are then subjected to heat treatment to carbonize the product. The carbonized product is then subjected to activation by steam treatment or by other oxidizing gas, such as air, chlorine, flue gas and the like, or other activating treatments, and in the present instance where hardwood charcoal is utilized the carbonized and steam treated char is subjected to treatment with dilute acids such as hydrochloric acid to remove the impurities, subsequently water-washed and then dried.

Any suitable equipment may be used in the process, such as standard equipment for mixing, grinding, filtering, heat treatment, acid treatment, and washing with suitable modifications for the conditions required. The conditions of treatment may vary over a wide range. For example, during briquetting or molding the pressure may vary from one ton per square inch to several hundred tons per square inch, more or less, or sufficient pressure only to mold the mixture may be employed. In the carbonizing treatment temperatures of from approximately 900° F. to 1800° F., more or less, have been employed. For steam activation or other gas activating treatments temperatures of from 1200° to 1800° more or less, have been employed. The acid concentrations for the treatment of the activated products may vary less than 1% to 10% and upwards and various acids may be employed, such as hydrochloric, sulphuric, etcetera. During carbonization and activation the time of treatment will depend upon temperature conditions as well as other conditions and schedules varying from fifteen minutes up to several hours and longer have been employed.

A specific example describing the preparation of decolorizing and/or adsorbent charcoal according to my process is given below.

The raw materials used here are charcoal, preferably from hardwood, such as maple, oak, hickory, birch, and the like, or mixtures of the same with carbon-black of approximately 150 mesh and upward; pitch from the distillation of wood, preferably hardwood pitch of approximately 250° F. melting point, or of sufficient hardness to be ground, is employed in making the suspension of the binder. The pitch is ground approximately 50 mesh and upward, preferably by first crushing and then grinding wet in a ball mill, using a protective colloid such as casein which is dissolved in an alkali solution, preferably sodium carbonate solution or dilute ammonia. Creosote oil from the distillation of high temperature coal tar or other coal tar distillate, or wood tar distillate, is emulsified in the solution made by dissolving casein in an alkali, such as sodium carbonate. The emulsion of oil is added to the suspension of pitch, or vice versa, to prepare the emulsified binder, as disclosed in my Patent No. 1,440,356. As an example of the preparation of the casein solution, approximately 1% by weight of sodium carbonate may be dissolved in water, the solution heated to approximately 150° F. and into the heated alkaline solution is stirred approximately 2% by weight of casein. The solution is preferably allowed to cool before using.

The solution may be diluted before making up the pitch suspension, which may be prepared by adding an equal part by weight of the diluted solution to the finely divided pitch, stirring vigorously and then preferably subjecting the paste or suspension to a grinding or attrition action, such as in a ball mill. To this is added an emulsion of coal tar or wood tar distillates, preferably creosote oil prepared by emulsifying the oil in an equal part of the aforementioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, for example, of 50 to 60 parts of the creosote oil for each 100 parts of the hard pitch.

Hardwood charcoal, for example, that from maple, oak, hickory, birch, or the like, ground to approximately 150 mesh and upward, is then mixed with the emulsion. Preferably, the charcoal is moistened with or suspended in some of the dilute casein solution. As one example, the final mixture of creosote oil, pitch and charcoal should contain approximately 50 to 60 parts of oil, 100 parts of pitch, and 260 parts of charcoal by weight, and in addition there will be present very small proportions of soda ash or sodium carbonate and casein.

As a general rule, only sufficient water is present with each of the individual components to permit thorough mixing so that preferably the various components are finally suspended in water to the consistency of a thin paste. Generally speaking, somewhat in excess of an equal quantity of water containing the protective agents, such as sodium, carbonate and casein, is required relative to the suspended materials. After thoroughly mixing all the components the water is separated, preferably by filtering. A vacuum type filter has been found suitable for this purpose. In some cases the addition of carbon-black or other filter aid facilitates filtration.

The residue on the filter is then dried by heating, for example, starting with a temperature of 250° F. and completing at approximately 190° F. During drying lumping may occur, and it may be desirable that the mixture be kept in more or less a state of agitation to obtain proper drying. It is not necessary that the mixtures be completely dried, as the presence of moisture assists in molding or briquetting the mixture later. The dried mixture while still warm, or by later heating, is fed into a briquetting press and pressed at a pressure of approximately 5 to 6 tons per square inch. A prolonged type of pressure in briquetting appears to be desirable and repeated application of the pressure is of value. A plunger type of press has been found satisfactory for this purpose. The briquettes are crushed to the desired size and carbonized. In some cases they are crushed to 8 mesh and upwards, carbonized, and then subsequently ground to smaller sizes for further treatment, or they may be ground to a smaller mesh before carbonization. 15 to 30 mesh has been found a suitable size for carbonization operations. The principal question here is one of losses to avoid going through several grinding operations.

In the carbonization operation, heating schedules from 20 to 30 minutes at temperatures varying from 1200° to 1500° F. have been found satisfactory. Generally speaking, carbonization in thin layers is preferred. The use of a continuous rotary type of furnace has been found satisfactory. The principal object here is to heat each particle uniformly and prevent deposition of secondary carbon. After the carbonization treatment the charge is subjected to a second heat treatment in the presence of steam at temperatures between approximately 1500° F. and 1700° F. for about 20 to 30 minutes. In some cases it has been found desirable to introduce steam into the charge while undergoing carbonization.

A final activating treatment is given the charcoal, which consists in treating the same with a dilute aqueous solution of acid such as hydrochloric acid. A 2–4% solution of hydrochloric acid has been found satisfactory for this treatment. Preferably the acid is heated during the treatment and is either circulated through the bed of char or the char suspended in the hot acid and treated for the necessary period of time. This treatment removes ash and other impurities. The char is finally water washed and dried. The finished char yield is approximately 80% by weight of the components. The hydrocarbons are removed from the mixture and may be wasted to the atmosphere, burned or partly recovered and reused as desired.

As an example of the characteristics of the products the following is given:

A solution of raw sugar was made containing approximately 150 grams of raw brown sugar per liter of solution. This sugar solution was a deep brown color. Approximately 8 grams of char of approximately 30 to 80 mesh was added to approximately 100 ccs. of sugar solution and vigorously stirred for 5 minutes at a temperature of approximately 195° F. The solution was then filtered and the resulting filtrate was practically water white in color. When the same test was made using two and one-half times the weight of high grade bone black, that is, approximately 20 grams employing the same conditions of treatment, the resulting filtrate was light brown in color.

In another series of tests several highly activated high-priced commercial chars were tested and found to be inferior to the present product.

In a set of comparative tests with high grade bone blacks using raw sugar solution and various dyes the product of the process described had an efficiency of from 2 to 10 times that of the bone black.

The examples given are illustrative only of the process and are not to be construed as limitations thereof.

I claim as my invention:

1. A process for the production of activated carbon, which comprises mixing hardwood charcoal in a finely divided state with an aqueous emulsion of a binder which chars on heating, made by combining a suspension of hard pitch from a coal tar in an alkaline aqueous solution of casein with an emulsion of oil in a similar medium, separating the water from the mixture, compressing the mixture, comminuting the compressed product, subjecting the comminuted product to heat treatment to char the same, activating the heat-treated product by subjecting it to treatment with steam and subjecting the heat-treated and activated product to the action of a dilute acid to remove acid soluble components.

2. A process for the production of activated carbon, which comprises mixing hardwood charcoal in a finely divided state with an aqueous emulsion of a binder which chars on heating, made by combining a suspension of hard pitch from a wood tar in an alkaline aqueous solution of casein with an emulsion of oil in a similar medium, separating the water from the mixture, compressing the mixture, comminuting the compressed product, subjecting the comminuted product to heat treatment to char the same, activating the heat-treated product by subjecting it to treatment with steam and subjecting the heat-treated and activated product to the action of a dilute acid to remove acid soluble components.

JACQUE C. MORRELL.